Oct. 8, 1940.  W. C. SMITH  2,217,140
SECTIONAL ARTICLE MOLD
Filed May 10, 1939  4 Sheets-Sheet 1

Inventor
Wilbert C. Smith

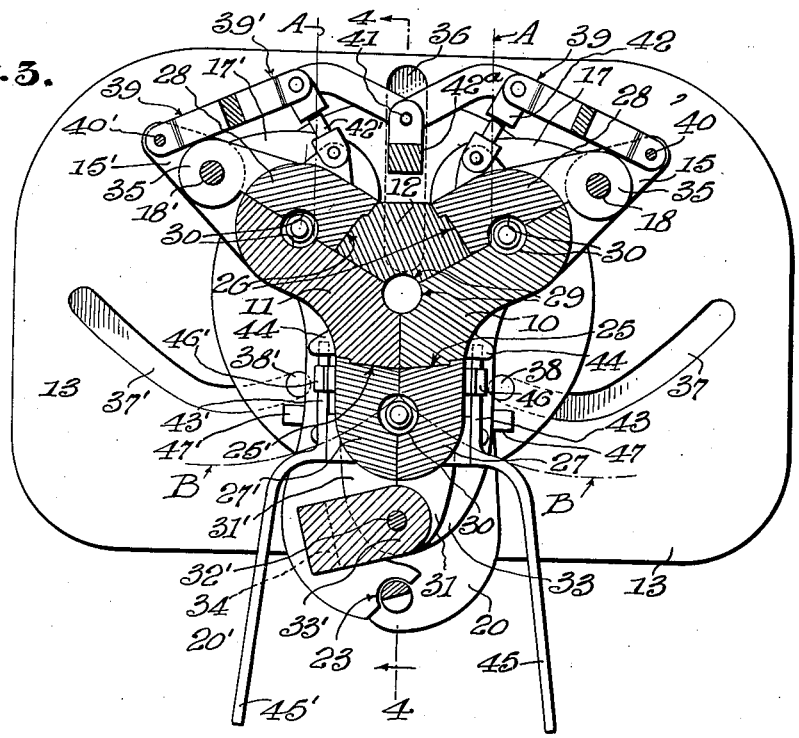

Oct. 8, 1940.  W. C. SMITH  2,217,140
SECTIONAL ARTICLE MOLD
Filed May 10, 1939   4 Sheets-Sheet 3

INVENTOR
Wilbert C. Smith

WITNESS
H. Woodard

By
H. B. Willson &co
Attorneys

Oct. 8, 1940. W. C. SMITH 2,217,140
SECTIONAL ARTICLE MOLD
Filed May 10, 1939 4 Sheets-Sheet 4

Inventor
Wilbert C. Smith

WITNESS
H. Woodard

Patented Oct. 8, 1940

2,217,140

UNITED STATES PATENT OFFICE 2,217,140

SECTIONAL ARTICLE MOLD

Wilbert C. Smith, Washington, Pa.

Application May 10, 1939, Serial No. 272,890

10 Claims. (Cl. 49—73)

The invention relates to sectional molds for use in the manufacture of articles from glass or other materials, aims to provide a new and improved construction for expeditiously molding a candelabra or similar article having a plurality of branches, and is of particular advantage for molding a candelabra or the like having three branches.

One of the most important objects of the invention is to provide an improved construction preventing the molded article from interfering with easy opening of the mold. In attaining this end, the main mold sections carry only the molding surfaces which do not so abut the molded article as to interfere with opening said main sections, and all molding surfaces which abut the molded article in such manner that they would prohibit opening of said main sections if carried thereby, are carried by auxiliary sections to be opened ahead of said main sections.

A further object is to make novel provision for opening and closing both the main and auxiliary mold sections, and in this connection, another aim is to provide two handles which are operable to first release latches for two of the auxiliary sections, are then operable to open these auxiliary sections, and are further operable to open the main mold sections.

Yet another object is to provide novel means whereby the opening movements of two of the main mold sections will automatically move auxiliary mold sections of a third main section from engagement with the molded article, preparing said third main section for movement away from said article.

With the foregoing and minor objects in view, the invention resides in the novel subject matter hereinafter described and claimed, description being accomplished by reference to the accompanying drawings.

Figure 3 is a horizontal section substantially on line 3—3 of Fig. 4.

Figure 4 is a vertical section on line 4—4 of Fig. 3.

A preferred construction has been illustrated and will be rather specifically described, with the understanding, however, that within the scope of the invention as claimed, numerous variations may be made.

Figure 6:
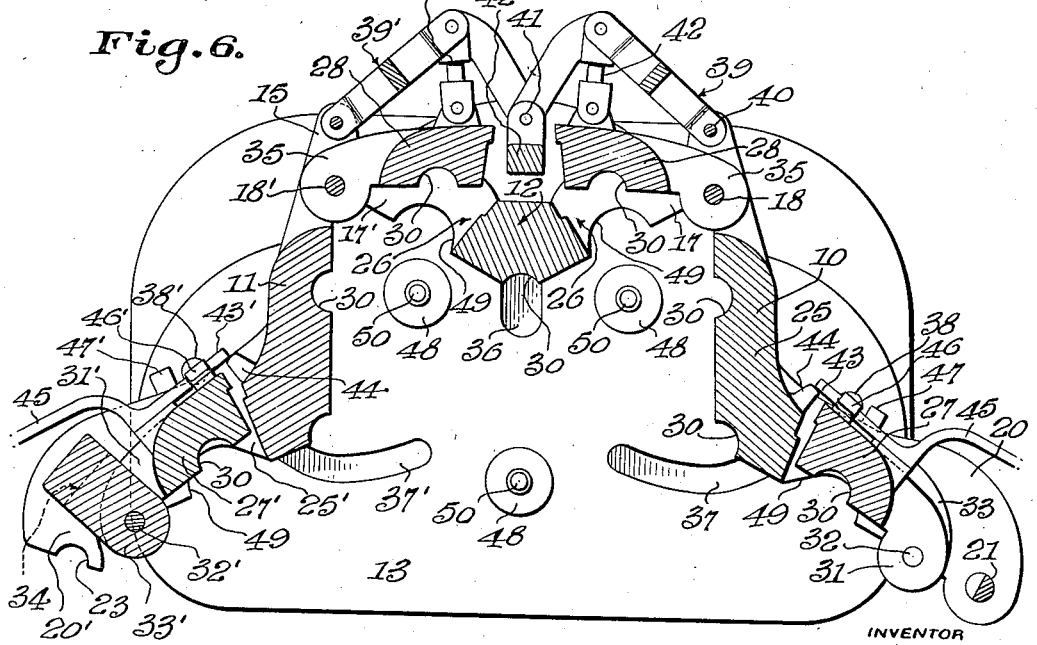
Fig. 6 is a horizontal sectional view showing the mold completely opened.
Figure 7:
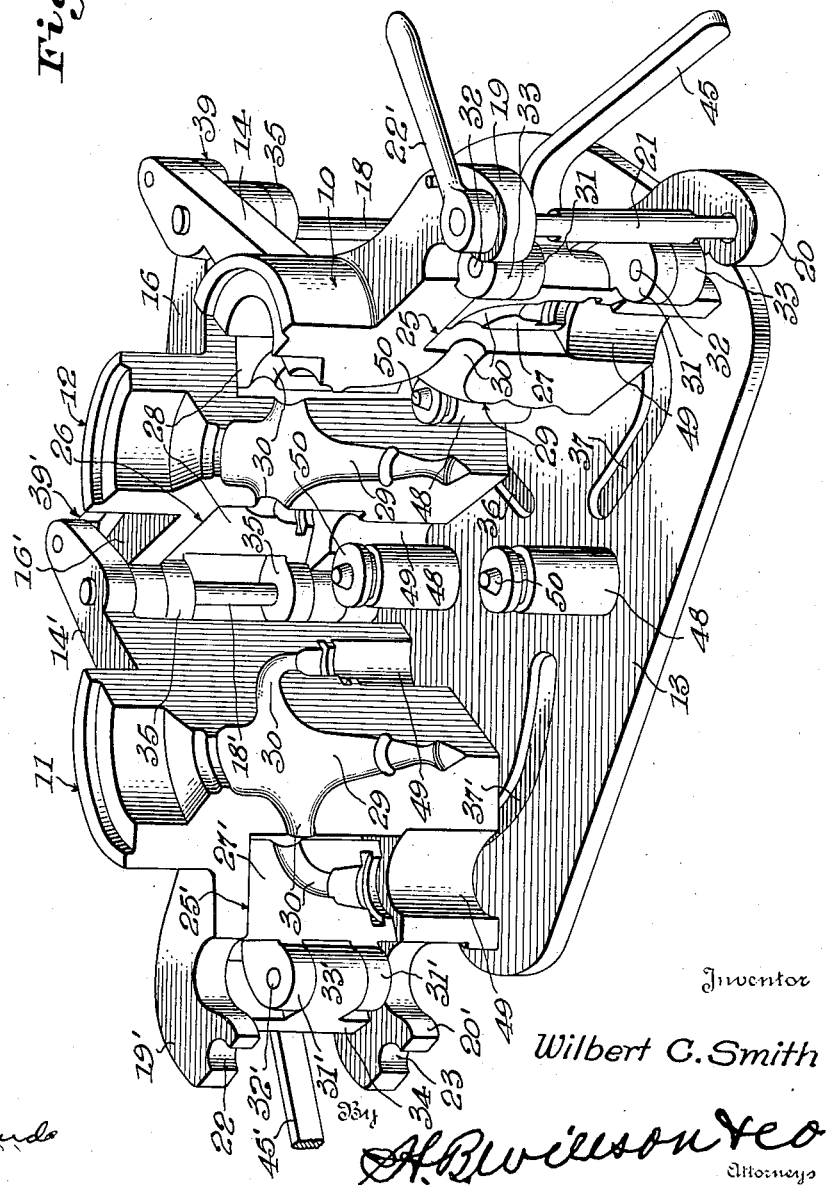
Fig. 7 is a perspective view showing the mold completely opened.

A mold is shown having a series of three main mold sections 10, 11 and 12 slidably supported upon a horizontal base 13, said sections being hingedly connected with each other for relative opening as seen in Figs. 6 and 7, said sections, however, being normally held in cooperative relation by means of a detachable connection between the sections 10 and 11, as hereinafter described.

The sections 10, 11 and 12 are of segmental form in the present disclosure, and said sections are provided with arms instrumental in hingedly connecting them. The section 10 has two of these arms denoted at 14 and 15 respectively, and the section 11 is provided with two corresponding arms 14' and 15'. The section 12 is provided with two arms 16 and 17 hingedly connected by a vertical rod 18 with the arms 14 and 15 of the section 10, and said section 12 is provided with other arms 16' and 17' hingedly connected by a rod 18' with the arms 14' and 15' of the section 11.

The section 10 is provided with upper and lower forwardly projecting arms 19 and 20 in which a vertical eccentric lock 21 is rotatably mounted, said lock having a handle 22' at its upper end. The section 11 is also provided with upper and lower forwardly projecting arms 19' and 20' with which the lock 21 is engageable to detachably connect the mold sections 10 and 11 when the mold is closed in readiness for use, said arms 19' and 20' having notches 22 and 23 in which portions of the lock 21 are then received. By turning the handle 22' to the position of Fig. 7, however, the lock portions are moved from the notches, permitting the three main mold sections 10, 11 and 12 to be relatively opened as seen in Figs. 6 and 7.

Figure 5:
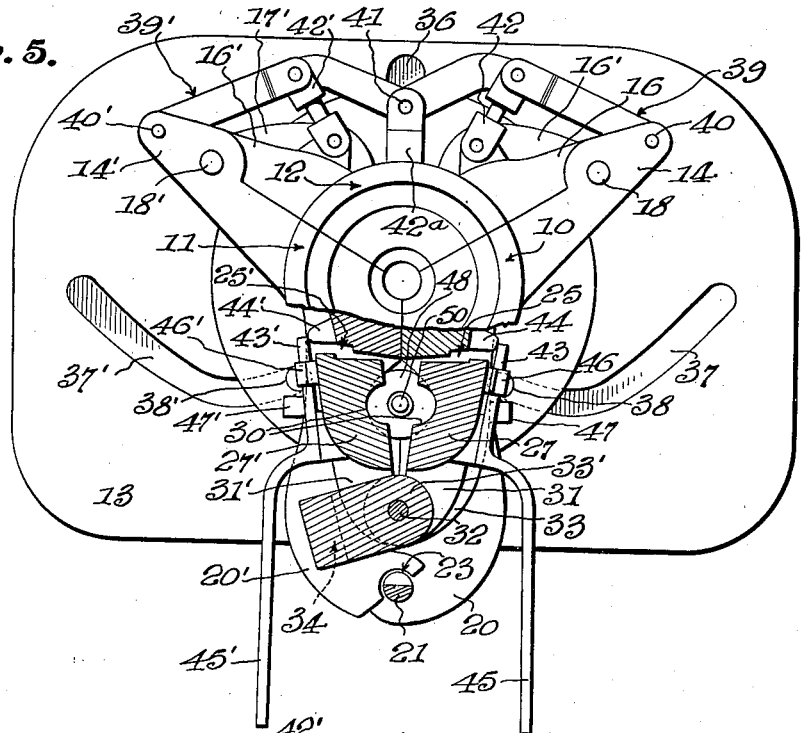
Fig. 5 is a top plan view partly in horizontal section showing two of the auxiliary mold sections outwardly moved to the positions at which they clear the molded article.

The main mold section 10 is formed with an opening 25 from its inner to its outer side, the section 12 is formed with two similar openings 26, and the section 11 is provided with a corresponding opening 25'. One auxiliary mold section 27 is movably mounted in the opening 25, two auxiliary mold sections 28 are movably mounted in the openings 26, and an auxiliary mold section 27' is movably mounted in the opening 25'. The various main and auxiliary mold sections are recessed to provide molding surfaces which cooperate in forming a molding cavity in the complete mold in which to mold a central supporting pedestal (for example of a candelabra) and three branches radiating from said central pedestal. The molding surfaces 29 which form the central pedestal are carried entirely by the main mold sections 10, 11 and 12, and the molding surfaces 30 which form the branches are carried partly by said main sections and partly by the auxiliary mold sections 27, 28 and 27'. The molding surfaces carried by the main mold sections 10, 11 and 12, are those surfaces which do not so abut the molded article as to interfere with opening of said main sections. The molding surfaces carried by the auxiliary mold sections 27, 28 and 27', however, are those surfaces which so abut the molded article that they will prohibit opening of the main sections 10, 11 and 12, until the auxiliary mold sections are first moved outwardly from engagement with the molded article. When the sections 27 and 27' are moved outwardly as seen in Figs. 5 and 7, the main mold sections 10 and 11 may be swung outwardly from the molded article as will be clear from Figs. 6 and 7, and I make novel provision whereby the initial outward movement of said sections 10 and 11 will outwardly move the auxiliary sections 28 of the mold section 12, preparing this section 12 for outward movement from the article, as hereinafter fully described.

In mounting the auxiliary section 27, it is preferable to provide it with knuckles 31 pivoted at 32 to other knuckles 33 on the arms 19 and 20 of the mold section 10. Similarly, in mounting the section 27', it is preferable to provide this section with knuckles 31' pivoted at 32' to a knuckle 33' carried by the section 11, said knuckle 33' being between the arms 19' and 20' and secured to a vertical member 34 extending between said arms, as probably seen most clearly in Fig. 7. Knuckles 35 are shown on the mold sections 28, said knuckles being pivotally engaged with the hinge rods 18 and 18' above described. By mounting the auxiliary mold sections 27, 28 and 27' in this or an equivalent manner, while said sections must move on arcs in traveling from closed to open position, such arcs are such that no binding of said sections against the molded article, will occur.

In Figure 3, the dot and dash lines A illustrate the paths on which portions of the molding surfaces 30 would have to travel away from the molded article if said portions of said surfaces were carried by the main section 12 instead of by the auxiliary sections 28, showing that said portions of said surfaces would lock said section 12 against opening if carried thereby. Similarly, in Figure 3, the dot and dash arcs B illustrate the paths on which portions of the molding surfaces 30 would have to travel if carried by the main sections 10 and 11, which would cause these portions to lock against the molded article and prohibit mold opening. By providing the auxiliary sections 27, 27' and 28 to be opened ahead of the opening movements of the main sections, no such locking of the mold upon the molded article can occur.

Figure 1:
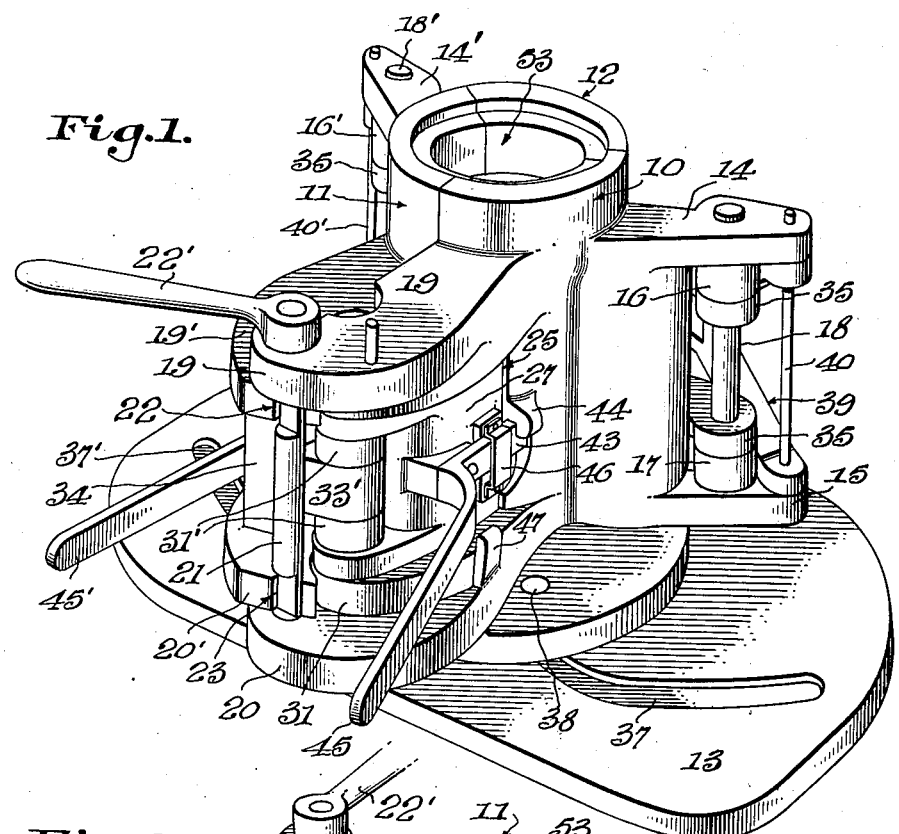
Figure 1 is a perspective view looking toward the front and one side of the mold.
Figure 2:
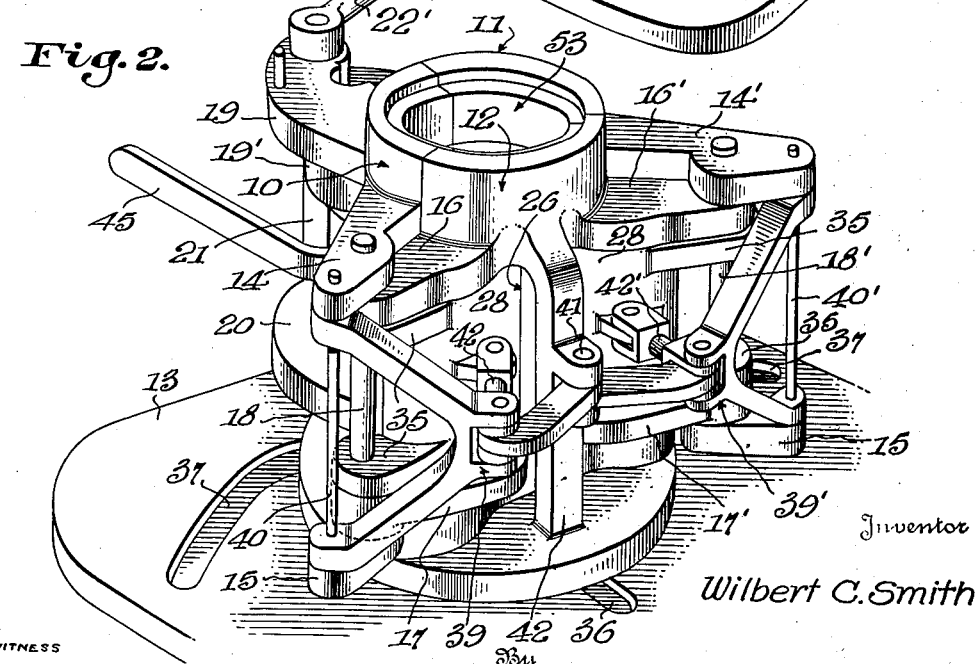
Figure 2 is a perspective view looking toward the rear.

The mold section 12 is mounted slidably upon the base 13 for movement away from the molded article, this being preferably accomplished by providing said base with a groove 36 and by providing the lower end of said section 12 with a rib 37 (Fig. 4) slidably received in said groove 36. The base 13 is also provided with two arcuate cam tracks 37 and 37' with which the mold sections 10 and 11 are engaged in such manner that outward swinging of said mold sections 10 and 11 will cause the three connected sections 10, 11 and 12 to shift rearwardly upon the base 13 as will be clear from Figs. 6 and 7, thus sliding the main section 12 away from the molded article as the main sections 10 and 11 are swung away from said article. Preferably, the cam tracks 37 and 37' are in the form of grooves, the mold sections 10 and 11 being provided with studs or the like 38 and 38' (see Figs. 1 and 3) received in said grooves. Provision is made whereby the initial outward swinging of the main sections 10 and 11 will effect outward movement of the auxiliary sections 28 of the main section 12, thereby freeing said section 12 for rearward movement before any attempt is made to rearwardly move same. For this reason, the inner ends of the tracks 37 and 37' are so shaped as to allow the initial outward swinging of the sections 10 and 11 without forcing these sections and the rear section 12 rearwardly, said inner ends of the tracks, in other words, being concentric with the hinge rods 18 and 18' when the mold is closed, as seen in Fig. 3.

One toggle 39 is pivoted at one end to the arms 14 and 15 of the mold section 10, and another toggle 39' is pivoted at 40' to the arms 14' and 15' of the mold section 11, the inner ends of both toggles 39 and 39' being pivoted at 41 to a vertical bar 42ᵃ forming part of the mold section 12. The toggle 39 is connected by a link 42 with one of the auxiliary sections 28 of the mold section 12, and the toggle 39' is connected by a link 42' with the other of said auxiliary sections 28. The outer toggle pivots 40 and 40' are rearwardly spaced from the hinge rods 18 and 18' and the two toggles are so positioned that they will outwardly buckle when the mold sections 10 and 11 are initially swung outwardly. This outward buckling of the toggles thus pulls upon the links 42 and 42', outwardly moving the auxiliary mold sections 28 away from the molded article before the cam tracks 37 and 37' come into play to effect rearward shifting of the three connected sections 10, 11 and 12 to free the molded article.

Two vertically swingable latches 43 and 43' are pivoted to the auxiliary mold sections 27 and 27' respectively, and are normally engaged with lugs 44 and 44' to hold said auxiliary sections 27 and 27' in closed position. Forwardly projecting handles 45 and 45' are secured to the latches 43 and 43' for moving them to released positions, whereby said handles may then be swung inwardly as seen in Fig. 5, to swing the auxiliary sections 27 and 27' outwardly. When in these positions, the handles 45 and 45' may be moved to positions in which the latches 43 and 43' abut the outer ends of the lugs 44 and 44' as seen in Fig. 5, thereby holding the auxiliary sections 27 and 27' open and permitting the handles 45 and 45' to be used in outwardly swinging the main sections 10 and 11. In the present disclosure, the movements of the handles 45 and 45' to effect mold opening, are first upwardly, then inwardly, then downwardly and then outwardly, and these movements are, of course, reversed upon closing of the mold.

Suitable guides 46 and 46' are shown for the latches 43 and 43' to limit the vertical movements thereof, and I have shown stop lugs 47 and 47' on the arms 20 and 20' to limit the outward swinging of the auxiliary mold sections 27.

Three upstanding posts 48 have been shown on the base 13 to close the lower ends of the recesses in which the branches of the candelabra or the like are molded, the main mold sections being recessed at 49 to receive said posts. Core pins 50 are also shown projecting upwardly through the posts 48 to form candle-holding sockets in the branches, said core pins being secured to a plate 51 (Fig. 4) which may be raised and lowered by any known mechanism.

A suitable plunger 52 is shown for pressing the glass or other molding material from the receiving well 53 into all portions of the molding cavity, and a throat ring 54 has been illustrated engaged with the upper end of the mold and having an opening to receive said plunger.

With the mold closed as in Figs. 1, 2, 3 and 4, the proper quantity of glass or other molding material is placed in the well 53 and the plunger 52 is then operated to press the material into all portions of the molding cavities. The core pins 50 are then lowered, after raising the plunger, and the lock 21 is released by means of the handle 22'. The two handles 45 and 45' are then operated to first release the latches 43 and 43', to then swing the auxiliary mold sections 27 and 27' outwardly from the molded article, and to then outwardly swing the main mold sections 10 and 11. The initial outward movement of the sections 10 and 11 is utilized to operate the toggles 39 and 39', causing them to pull upon the links 42 and 42', thereby outwardly swinging the auxiliary mold sections 28 of the main rear section 12. By the time these sections 28 have been outwardly moved from engagement with the molded article, the cam tracks 37 and 37' have started to function, causing the three connected sections 10, 11 and 12 to slide rearwardly upon the base 13, thus freeing the section 12 from the molded article by rearward movement therefrom, as the sections 10 and 11 are freed from said article by outward swinging.

Excellent results are obtainable from the details shown and described and they may, therefore, be followed if desired. However, attention is again invited to the possibility of making numerous variations within the scope of the invention as claimed. Furthermore, while the particular structure herein disclosed is intended for molding a branched article, it will be obvious to those skilled in the art, that features of the invention are not restricted to a mold for this particular purpose.

I claim:

1. An article mold comprising three main segmental sections having molding surfaces cooperable in forming a central molding cavity in which to mold a central pedestal, means hinging two of said main sections to the third for opening away from the mold axis, means for detachably connecting said two sections with each other, four auxiliary mold sections cooperatively related with said main sections, two of said auxiliary sections being associated with said two main sections respectively, and the other two of said auxiliary sections being both associated with said third main section, said main and auxiliary sections having additional molding surfaces cooperable in forming three cavities radiating from said central cavity in which to mold branches on said pedestal, and means movably mounting said auxiliary sections upon said main sections for outward movement from said branches, the molding surfaces of said main sections being those surfaces which do not so abut the molded article as to interfere with opening said main sections, the molding surfaces of said auxiliary sections being surfaces which so abut the molded article as to prohibit opening said main sections until said auxiliary sections are disengaged from said molded article.

2. An article mold comprising three main segmental sections having molding surfaces cooperable in forming a central molding cavity in which to mold a central pedestal, means hinging two of said main sections to the third for opening away from the mold axis, means for detachably connecting said two sections with each other, four auxiliary mold sections cooperatively related with said main sections, two of said auxiliary sections being associated with said two main sections respectively, and the other two of said auxiliary sections being both associated with said third main section, said main and auxiliary sections having additional molding surfaces cooperable in forming three cavities radiating from said central cavity in which to mold branches on said pedestal, means movably mounting said auxiliary sections on said main sections for outward movement from said branches, and operating connections between said two main sections and the two auxiliary sections of said third main section for normally holding these two auxiliary sections and for outwardly moving same as said two main sections are relatively opened, the molding surfaces of said main sections being those surfaces which do not so abut the molded article as to interfere with opening said main sections, the molding surfaces of said auxiliary sections being surfaces which so abut the molded article as to prohibit opening said main sections until said auxiliary sections are disengaged from said molded article.

3. An article mold comprising three main segmental sections having molding surfaces cooperable in forming a central molding cavity in which to mold a central pedestal, means hinging two of said main sections to the third for opening away from the mold axis, means for detachably connecting said two sections with each other, four auxiliary mold sections cooperatively related with said main sections, two of said auxiliary sections being associated with said two main sections respectively, and the other two of said auxiliary sections being both associated with said third main section, said main and auxiliary sections having additional molding surfaces cooperable in forming three cavities radiating from said central cavity in which to mold branches on said pedestal, two toggles connected with said two main sections and with said third main section to buckle outwardly when said two main sections are swung outwardly, means connecting said toggles with said two auxiliary sections of said third main section for normally holding these two auxiliary sections and for outwardly moving same when said toggles buckle outwardly, the molding surfaces of said main sections being those surfaces which do not so abut the molded article as to interfere with opening said main sections, the molding surfaces of said auxiliary sections being surfaces which so abut the molded article as to prohibit opening said main sections until said auxiliary sections are disengaged from said molded article.

4. An article mold comprising three main segmental sections having molding surfaces cooperable in forming a central molding cavity in which to mold a central pedestal, means hinging two of said main sections to the third for opening away from the mold axis, means for detachably connecting said two sections with each other, four auxiliary mold sections cooperatively related with said main sections, two of said auxiliary sections being associated with said two main sections respectively, and the other two of said auxiliary sections being both associated with said third main section, said main and auxiliary sections having additional molding surfaces cooperable in forming three cavities radiating from said central cavity in which to mold branches on said pedestal, means movably mounting said auxiliary sections on said main sections for outward movement from said branches, latches for holding the two auxiliary sections of said two main sections in operative position, two handles carried by these two auxiliary sections for first releasing said latches, then outwardly moving the previously latched auxiliary sections, and then outwardly swinging said two main sections, and operating connections between said two main sections and the two auxiliary sections of said third main section for normally holding these latter auxiliary sections and for outwardly moving same as said two main sections are outwardly swung, the molding surfaces of said main sections being those surfaces which do not so abut the molded article as to interfere with opening said main sections, the molding surfaces of said auxiliary sections being surfaces which so abut the molded article as to prohibit opening said main sections until said auxiliary sections are disengaged from said molded article.

5. A structure as specified in claim 2; together with means for automatically moving said third main section away from the molded article as said two main sections are further swung outwardly after effecting outward movement of the auxiliary sections of said third main section.

6. An article mold comprising three main segmental sections having molding surfaces cooperable in forming a central molding cavity in which to mold a central pedestal, means hinging two of said main sections to the third for opening away from the mold axis, means for detachably connecting said two sections with each other, four auxiliary mold sections cooperatively related with said main sections, two of said auxiliary sections being associated with said two main sections respectively, and the other two of said auxiliary sections both being associated with said third main section, said main and auxiliary sections having additional molding surfaces cooperable in forming three cavities radiating from said central cavity in which to mold branches on said pedestal, means movably mounting said auxiliary sections on said main sections for outward movement from said branches, operating connections between said two main sections and the two auxiliary sections of said third main section for normally holding these two auxiliary sections and for outwardly moving same as said two main sections are outwardly swung, a base upon which the three main sections rest slidably, coacting means on said base and third main section for guiding the latter radially outward from the molded article, and cam tracks on said base engaged with said two main sections for so shifting the three connected main sections as to move said third section away from the molded article as said two main sections are outwardly swung, said tracks having portions which merely guide said two main sections during their initial outward movement without so shifting them as to shift said third section, whereby said third section is not shifted until the auxiliary sections thereof are disengaged from the molded article, said molding surfaces of said main sections being those surfaces which do not so abut the molded article as to interfere with opening said main sections, the molding surfaces of said auxiliary sections being surfaces which so abut the molded article as to prohibit opening said main sections until said auxiliary sections are disengaged from said molded article.

7. An article mold comprising a series of main sections hinged together for outward swinging from the molded article, releasable means for detachably connecting the endmost sections of said series with each other, an auxiliary mold section mounted on one of said endmost main sections for opening prior to opening of the latter, latch means for normally holding said auxiliary section closed, and a single handle connected with said auxiliary section and said latch means for first releasing said latch means, then opening said auxiliary section and then opening said one of said endmost main sections.

8. An article mold comprising a series of main sections hinged together for outward swinging from the molded article, releasable means for detachably connecting the endmost sections of said series with each other, an auxiliary mold section mounted on one of said endmost main sections for opening prior to opening of the latter, a vertically swingable latch pivoted to said auxiliary section for normally holding the same closed, a lug on said one of said main sections normally engaged by said latch, and a handle secured to said latch and projecting outwardly from said one of said main sections for first releasing said latch and then opening said auxiliary section, said handle being then movable to another position in which said latch so abuts said lug as to prevent closing of said auxiliary section, whereby said handle may then be used to open said one of said main sections.

9. In an article mold including two main sections for outward movement away from the molded article, and an auxiliary mold section mounted on one of said main sections to be opened before outward movement of the latter; connecting means between the other of said main sections and said auxiliary section for automatically opening said auxiliary section as said other main section is opened.

10. In an article mold including two main sections for outward movement away from the molded article, and an auxiliary mold section mounted on one of said main sections to be opened before outward movement of the latter; a toggle operatively connected with said one of said main sections and with the other thereof to buckle outwardly when said other of said main sections is outwardly moved, and connecting means between said toggle and said auxiliary section for opening the latter when said toggle buckles outwardly.

WILBERT C. SMITH.